Figure 1:
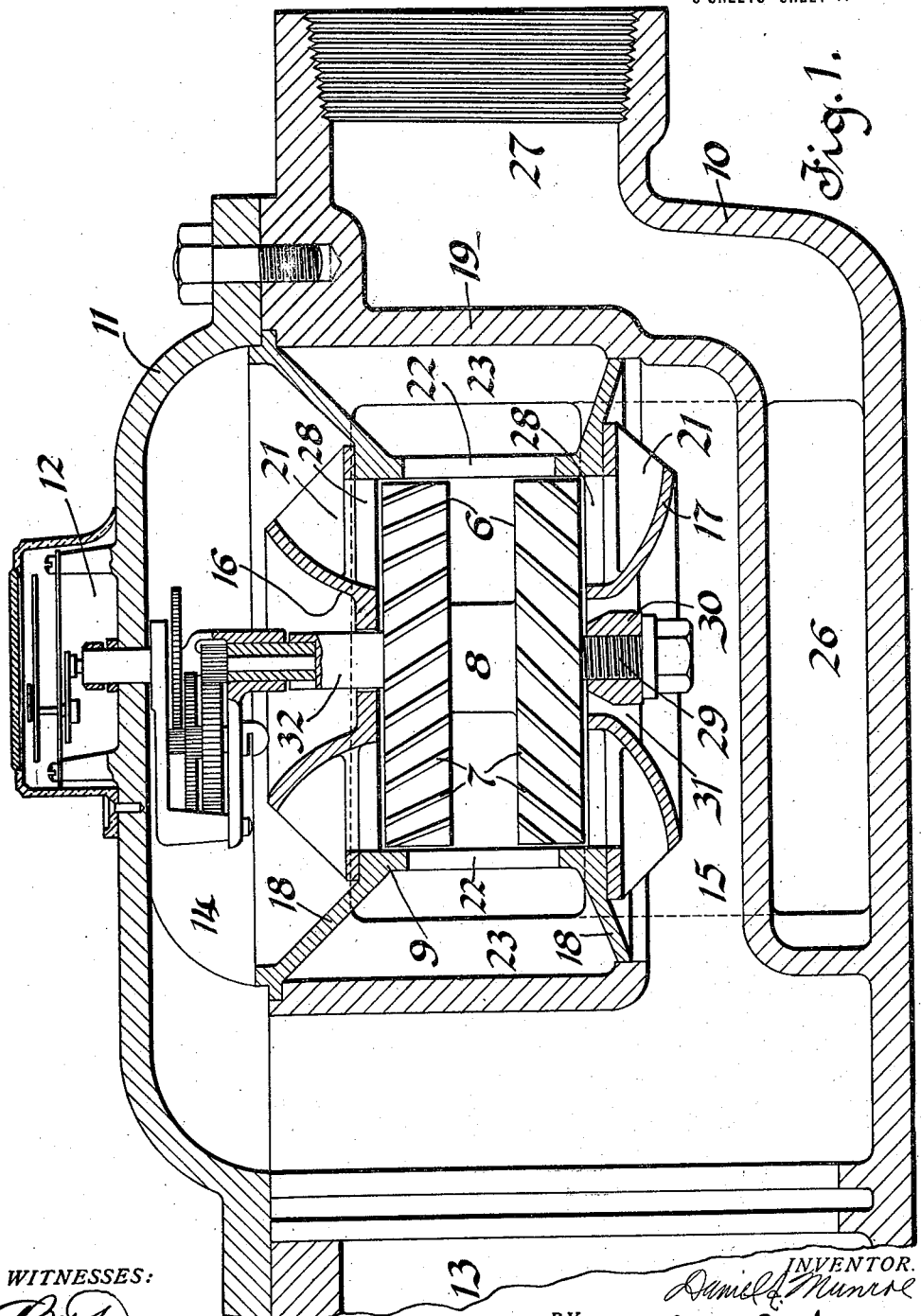

D. A. MUNROE.
CURRENT METER.
APPLICATION FILED MAR. 14, 1908.

1,190,251.

Patented July 4, 1916.
3 SHEETS—SHEET 1.

WITNESSES:

INVENTOR.
Daniel A. Munroe
BY
his ATTORNEY IN FACT.

UNITED STATES PATENT OFFICE.

DANIEL A. MUNROE, OF WILKINSBURG, PENNSYLVANIA, ASSIGNOR TO PITTSBURG METER COMPANY, A CORPORATION OF PENNSYLVANIA.

CURRENT-METER.

1,190,251.

Specification of Letters Patent.

Patented July 4, 1916.

Application filed March 14, 1908. Serial No. 421,091.

*To all whom it may concern:*

Be it known that I, DANIEL A. MUNROE, a citizen of the United States, and a resident of Wilkinsburg, in the county of Allegheny and State of Pennsylvania, have made a new and useful Invention in Current-Meters, of which the following is a specification.

This invention relates to water meters and more particularly to that type in which a wing wheel rotated by the water traversing the passages of the meter operates the indicating and registering mechanism of the meter.

An object of my invention is the production of a meter of this type in which the lateral or sidewise thrust on the wing wheel is counterbalanced. This and other objects I attain in a meter embodying the features hereinafter described and illustrated in the drawings accompanying this application and forming a part thereof.

Figure 2:
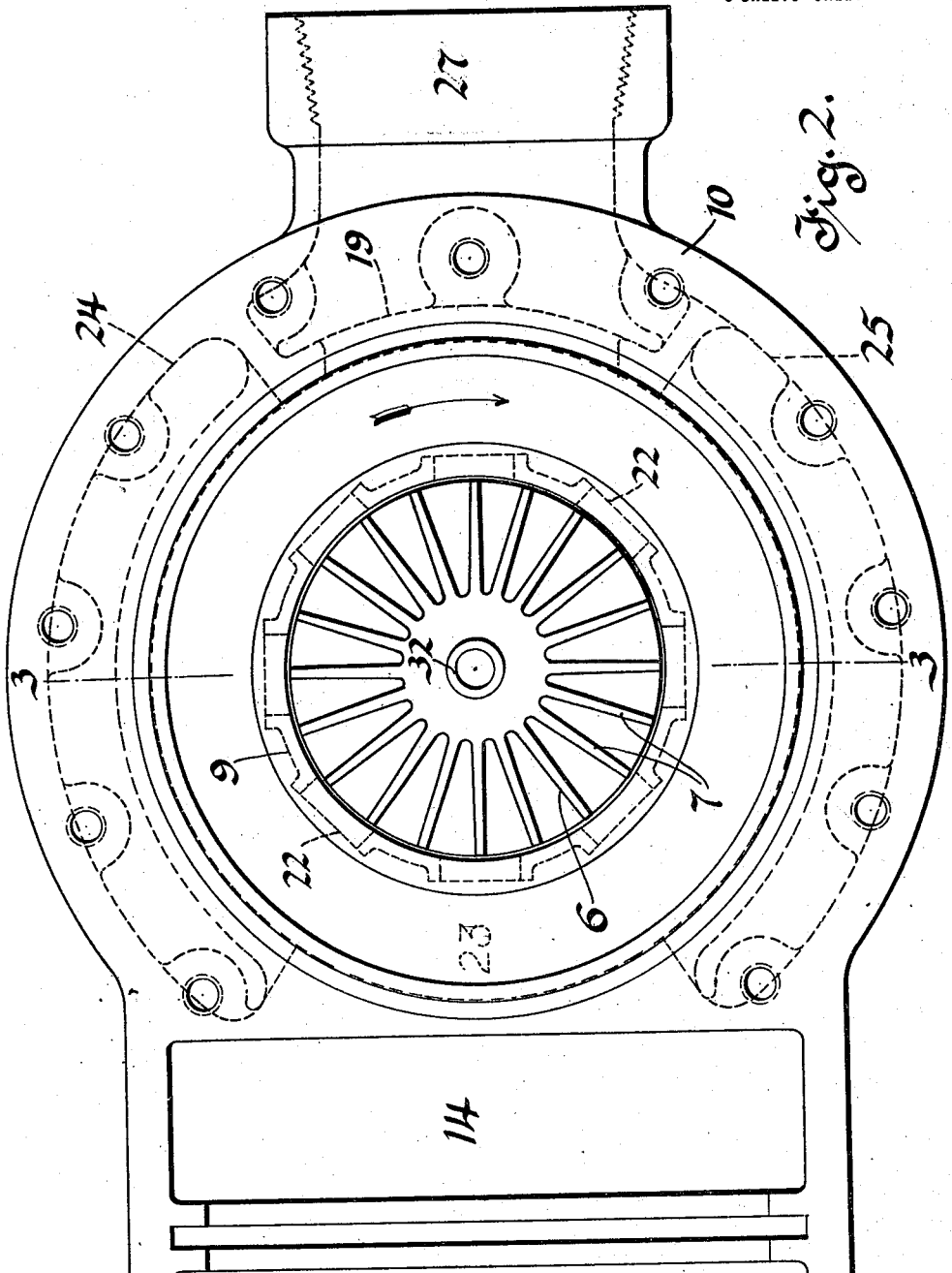
Figure 3:
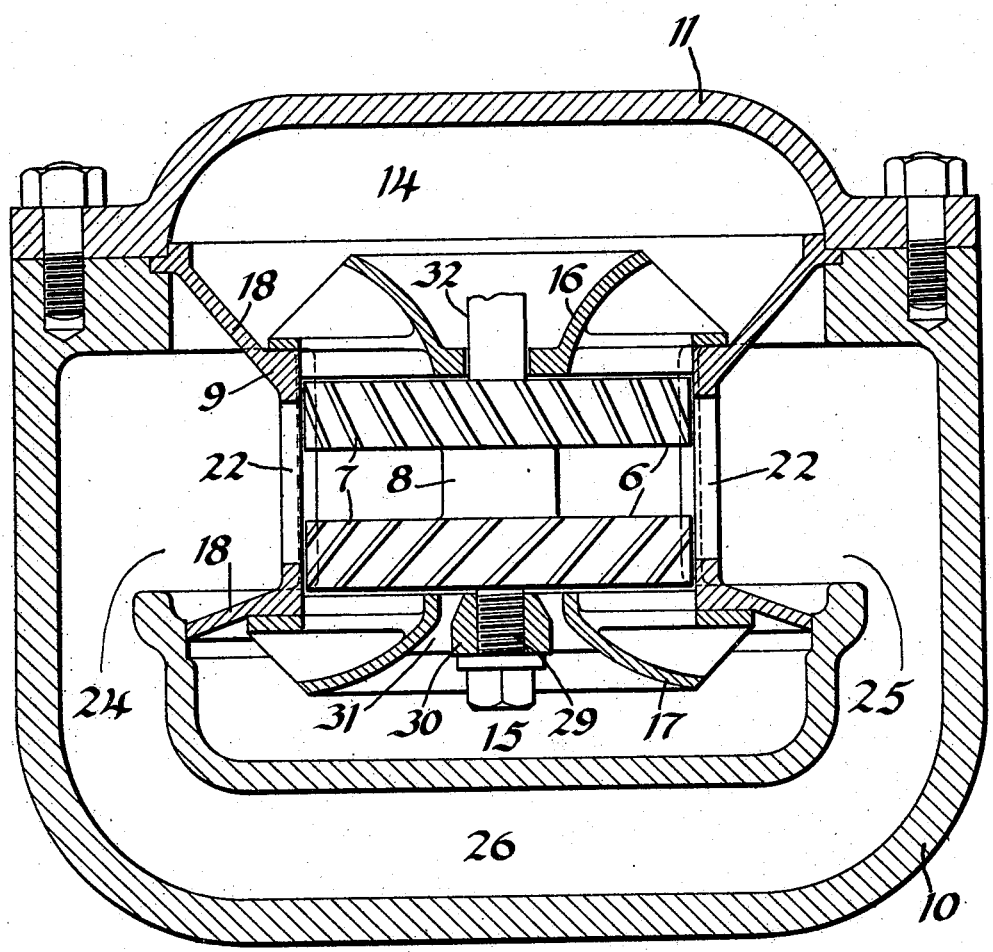

In the drawings: Figure 1 is a central sectional elevation, parts being broken away for convenience of illustration, of a meter embodying my invention; Fig. 2 is a plan view of the meter shown in Fig. 1, portions thereof having been removed for convenience of illustration; and Fig. 3 is a section along the line 3—3 of Fig. 2.

Various attempts have been made to produce a water meter in which the wing wheel is balanced longitudinally and laterally, but so far as I know, these have been successful in part only. The lateral or sidewise thrust of the wing wheel is ordinarily occasioned by an improper arrangement of the water passages within the meter, which permits the water to have a freer access to or a freer egress from one side than the other of the wheel.

My invention contemplates providing a meter in which the passages are so disposed that the lateral and longitudinal thrusts on the wing wheel are counterbalanced.

The water passages of the meter are arranged to divide the water delivered to and the water issuing from the wing wheel into two streams, so that the dynamic thrusts on the wing wheel occasioned by velocity energy of the water traversing the wheel casing are counterbalanced.

Referring particularly to the drawings, a wing wheel 6 is provided with two rows of oppositely-inclined blades 7 formed integrally with a hub portion 8. The wing wheel is inclosed by a wheel casing 9 and the casing 9 is inclosed by a meter casing 10 provided with a cover portion 11 to which the indicating mechanism 12 of the meter is secured. An inlet port (not shown) communicates with a passage 13 formed in the casing and delivers water to passages 14 and 15 respectively located above and below the wheel casing.

The wheel casing comprises a cylindrical portion and top and bottom portions 16 and 17 secured to the cylindrical portion and held in position by means of webs 28. The cylindrical portion is provided with annular flanges 18 supported on shoulders formed on a partition 19 of the wheel casing and which coöperate with the cover portion 11 in securing the wheel casing in place.

The top portion 16 of the wheel casing is provided with a plurality of delivery ports 21 which communicate with the passage 14 and which are adapted to deliver water to the top row of blades 7. The bottom portion 17 is provided with a plurality of ports 21 which communicate with the passage 15 and adapted to deliver water to the bottom row of blades 7. The cylindrical portion of the wheel casing is provided with peripherally-disposed ports 22 which are located between the two rows of blades carried by the wing wheel and which communicate with an annular delivery chamber 23 formed between the wheel casing and the diaphragm, or partition 19. The chamber 23 communicates by means of outlet passages 24 and 25, which are located diametrically opposite each other relative to the wing wheel, with a passage 26, formed in the bottom of the casing 10, and communicating with an outlet port 27 with which the casing 10 is provided.

The wing wheel is rotatably mounted on a pivot shaft 29 threaded into a collar 30 and which extends upwardly through the hub portion 8 of the wing wheel and forms a bearing for a pivot point (not shown) with which the wing wheel is provided. The collar 30 is supported by radially-extending webs 31 formed integrally with the bottom portion 17 of the wheel casing. This construction provides ports between the collar 30 and the portion 17 and the webs 31 which admit the water pressure of the passage 17 to the lower end of the hub portion 8. The upper end of the hub portion is provided with a projection 32 operatively connected to a driving portion of the indicating and registering mechanism designated at 12. Ordinarily the wing wheels of the meter are subjected to unequal static pressures which cause a preponderance of longitudinal thrust in one or the other direction and either cause the wing wheel to float off of its bearing or to be held against its bearing by too great a pressure. The ports in the bottom portion 17 below the hub 8 have been provided for the purpose of overcoming the difficulties ordinarily encountered.

The operation of the meter is as follows: Water is delivered to the meter through the delivery port of the casing 10 and, traversing the passage 13, is divided into two streams, one of which is delivered by the passage 14 to the ports 21 of the top portion 16 of the wheel casing and the other of which is delivered by the passage 15 to the ports 21 of the bottom portion 17 of the wheel casing. The water discharged by the ports 21 onto the blades 7 causes the wing wheel to rotate in the direction of the arrow shown in Fig. 2. The water discharged from each row of blades is re-united into one stream within the casing 9 and is delivered through the ports 22 into the annular chamber 23, where it is again divided into two streams and delivered through the outlet passages 24 and 25 to the passage 26 which communicates directly with the outlet port 27 of the casing 10. These outlet passages are so located that the water issuing from the delivery chamber and passing through them flows in a direction substantially at right angles to the direction of flow of the water issuing from the outlet port 27; or in other words, the water issuing from the chamber 23, and in passing through the passages 24 and 25 flows in a direction substantially at right angles to the general direction of flow of the water traversing the meter. These outlet passages are also so located that there is absolutely no tendency for the water issuing from the wheel casing to pass through one rather than the other. With the construction illustrated both the dynamic and static thrusts on the wing wheel occasioned by the water traversing the meter passages are balanced.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In a water meter, a wing wheel provided with two sets of oppositely disposed blades, a wheel casing surrounding the wing wheel and provided with peripherally disposed outlet ports, located between the two sets of blades of said wheel and two sets of inlet ports for delivering water in opposite directions to the separate sets of blades of the wheel, a meter casing surrounding the wheel casing, provided with an inlet port and an outlet port, and having an interior chamber surrounding the wheel casing and communicating with the outlet port through passages located diametrically on opposite sides of the wheel casing.

2. In a water meter, a meter casing having an inlet and a discharge port, a wing wheel rotatively mounted within the casing and having two sets of oppositely disposed blades, a wheel casing surrounding the wing wheel and having inlet ports located above and below the wheel and communicating with the inlet port of the meter casing, and peripherally located outlet ports communicating with an annular chamber surrounding the wheel casing and communicating with said outlet port of the meter casing through two oppositely disposed ports located in a line extending at right angles to the direction of flow through the outlet port and the general direction of flow through the meter.

3. In a water meter, a wing wheel, a wheel casing surrounding the wing wheel and provided with inlet ports located at both ends thereof, and peripherally disposed outlet ports, a meter casing inclosing the wheel casing and provided with an inlet and an outlet port, and having a chamber encircling the wheel casing communicating with the peripherally disposed outlet ports, and communicating with the outlet port of the meter casing in such a way as to counterbalance the reactive force of the water leaving the wing wheel for all flows.

4. In a water meter, a wing wheel, a wheel casing surrounding the wing wheel and provided with inlet ports located above and below the wing wheel, and peripherally disposed outlet ports located between the two sets of inlet ports, a meter casing inclosing the wheel casing and provided with an inlet port, an outlet port, and passages for delivering separate streams of water entering the inlet port to the separate sets of inlet ports of the wheel casing, a chamber formed within the meter casing around the wheel casing and communicating with the outlet ports thereof, and two outlet passages formed within the meter casing on opposite sides of the wheel casing and communicating with said chamber and with said outlet port of the meter casing.

5. In a meter, a wing wheel having two sets of oppositely disposed blades, a wheel casing surrounding the wing wheel and provided with two sets of inlet ports, one located above and one below the wing wheel, and peripherally disposed outlet ports located between the two sets of blades of the wing wheel, a meter casing having an inlet port and an outlet port and inclosing the wheel casing and forming therewith a delivery chamber which encircles the wheel casing and communicates with the outlet ports thereof, two oppositely disposed delivery passages formed within the meter casing and communicating with said delivery chamber and with the outlet port of the meter casing, the inlets of said passages being so located on opposite sides of the wheel casing that the liquid leaving the wheel casing is divided into two oppositely directed streams, each of which flows substantially at right angles to the direction of flow of the water through the outlet port of the meter casing.

6. In a meter, a wing wheel, a wheel casing surrounding the wing wheel and provided with inlet ports and outlet ports, a meter casing inclosing the wheel casing and provided with an inlet port communicating with the inlet ports of the wheel casing, an outlet port, a delivery chamber formed within the meter casing and communicating with the outlet ports of the wheel casing, and two outlet passages formed within the meter casing and oppositely disposed with relation to the wing wheel, each of said passages communicating with the delivery chamber and with the outlet port of the meter casing and being so located with relation to the delivery chamber that the liquid leaving said chamber and traversing the passages flows in a direction substantially at right angles to the direction of flow of liquid traversing the outlet port of the meter casing.

7. In combination in a meter, a wing wheel, a wheel casing surrounding the wing wheel and provided with inlet ports and outlet ports, a meter casing inclosing the wheel casing and provided with an outlet port and an inlet port, communicating through passages, oppositely disposed with relation to the wing wheel, with the inlet ports of the wheel casing, two outlet passages, formed within the meter casing and oppositely disposed with relation to the wing wheel and communicating with outlet ports of the wheel casing and the outlet port of the meter casing, said last mentioned passages being so located, with relation to the outlet ports of the wheel casing, that the liquid leaving the outlet ports of the wheel casing and traversing the passages flows in a direction substantially at right angles to the direction of flow of liquid traversing the outlet port of the meter casing.

In testimony whereof, I have hereunto subscribed my name this 11th day of March, 1908.

DANIEL A. MUNROE.

Witnesses:
CHARLES W. McGHEE,
E. W. McCALLISTER.

Copies of this patent may be obtained for five cents each, by addressing the "Commissioner of Patents Washington, D. C."